INVENTOR.
JOSEPH S. ACTERMAN

United States Patent Office 2,899,243
Patented Aug. 11, 1959

2,899,243

AUTOLUBRICATED GAS THRUST BEARING

Joseph S. Acterman, Long Beach, Calif., assignor to North American Aviation, Inc.

Application August 30, 1956, Serial No. 607,220

6 Claims. (Cl. 308—9)

This invention is a continuation in part of application Serial No. 416,995, filed March 18, 1954, now abandoned, and is concerned with a gas lubricated thrust bearing. More particularly, this invention is concerned with the development of a bearing surface for supporting the thrust of a rapidly rotating shaft.

A serious problem exists in providing satisfactory bearings for the rotors of precision scientific instruments and the like. The principal requirements for bearings in these applications are freedom from vibration, constancy of elastic properties, low power consumption, and freedom from wear. Simplicity and low cost are important secondary considerations.

Heretofore, ball bearings have found general use in instrument rotor support. Further, complex types of oil and gas lubricated thrust bearings have been suggested for use in scientific instruments and the like. In the scientific instrument field, the ultimate in instrument performance is required. These prior bearings have been found to have a greater than desired vibration, insufficient rigidity, and a high power consumption. The present invention solves the above difficultities by providing a simple, one piece, rigid thrust bearing having a low power consumption. These desired properties are attained by building into the surface of the thrust bearing a series of inclined surfaces separated by a series of plane surfaces or surfaces parallel to the member exerting the thrust. By reason of the particular configuration of the thrust bearing surface, the gas lubricated bearing develops a supporting force for the shaft associated therewith. The production of this supporting lift depends primarily on the viscosity of the gas.

The principal object of this invention is to provide a simplified gas lubricated thrust bearing for a rotating shaft.

A further object of this invention is to provide a gas lubricated thrust bearing characterized by its extreme rigidity and lack of vibration.

A still further object of this invention is to provide a thrust bearing or a rotating shaft which prevents metal-to-metal contact between the shaft and the thrust bearing.

An object of this invention is to provide an autolubricated thrust bearing suitable for use in scientific instruments.

An additional object of this invention is to provide a tapered surface thrust bearing for various bearing configurations.

Other objects of invention will become apparent from the following description taken in connection with the companying drawings, in which—

Figure 1:
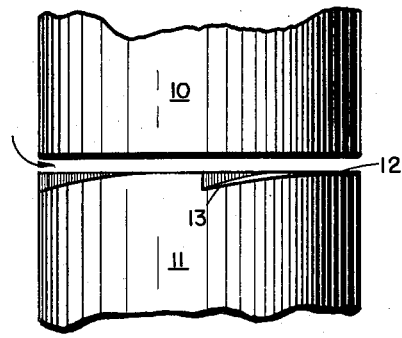
Fig. 1 is a plan view of a shaft and thrust bearing combination.

Fig. 1 illustrates a shaft end which is supported by a bearing 11 having a bearing surface consisting of a series of inclined surfaces 13, separated by a series of flat lands 12. Either the shaft 10 or the bearing 11 may be the rotating member. In operation, a load supporting layer is automatically generated by the shearing action taking place in the gap between the bearing 11 and the shaft 10. It has been found that the load carrying capacity of the thrust bearing is dependent upon the particular shape of the bearing surface or thrust pad. It has been discovered that an optimum profile exists for attaining a high shear rate and a high load capacity.

Figure 2:
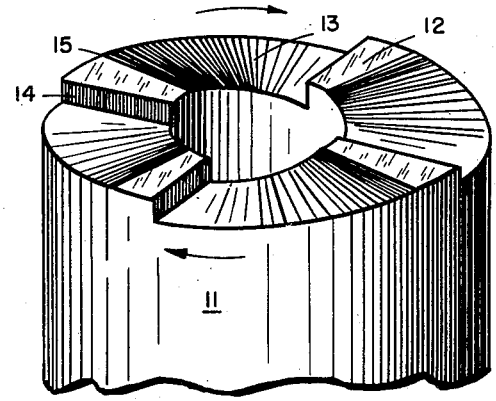
Fig. 2 is a perspective view of the thrust bearing surface.

Fig. 2 illustrates in perspective the optimum thrust pad configuration. The bearing surface of Fig. 2 comprises a series of inclined surfaces or portions 13 separated by a series of plane portions 12. The portions 12 and 13 may be said to be sectors formed by radial lines such as 14 and 15, extending from the geometric center of the bearing. The inclined portions 13 are preferably in the form of a section of a helix. The helical segments are placed adjacent to the plane surface of the associated shaft and either the plane surface or the surface containing the inclined portions or helical segments are caused to be rotated. The rotation of one of these parts results in a shearing of the gas between the surfaces at a varying rate. The varying rate of shear results in a net pressure that causes the plane surface of the shaft end and the helical inclined surfaces to be separated by the gas in the atmosphere that surrounds them.

The use of the helix has the effect of causing the rate of shear increase to be uniform as one traverses a circumferential line concentric with the geometric center of the bearing. This is the most effective form that a gas thrust bearing with a series of fixed inclined portions can achieve. The flat plane portion 12 that follows the helical inclined portion 13 is most efficient when the ratio of such surface to the inclined surface is one to four. The angle of inclination of the helix is of the order of one thousandth of a radian. This angle is, of course, variable and is dependent upon the particular load and speed of the associated shaft. This angle can be calibrated to give the maximum load capacity to the shaft and thrust bearing combination. It is necessary that the depth of the inclined surface be such that no appreciable pressure drop can take place. The flat or plane lands or sectors enable starting and stopping of the shaft and bearing combination with a minimum of damage to either of the parts. The load capacity of the bearing is a direct function of the depth of the incline at its greatest depth. This depth has been found to have a practical minimum value of 0.00006 inch and a maximum of 0.001. A preferred range of depth is 0.0002–0.004 inch.

Figure 3:
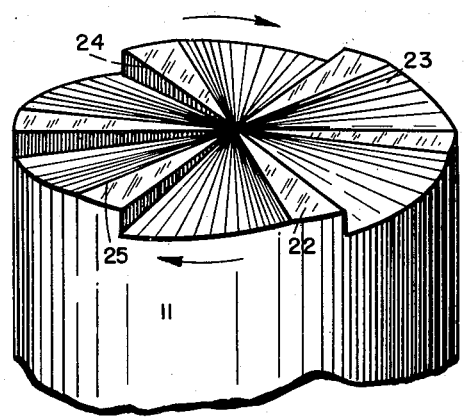
Fig. 3 is a modified thrust bearing surface.

Fig. 3 illustrates a non-annular type of thrust bearing surface likewise having inclined sectors 23 and flat sectors 22 formed, by example, by radials 24 and 25. It may be appreciated from looking at Figure 3 in comparison to Figure 2, that wedge sectors such as 23 are inclined in a first direction (from the center of the bearing toward the circumference of the bearing) and in a second direction (between successive radial lines). Such inclination in two directions may be defined generically as inclination "from the surface sectors," or, also, "transverse to the boundaries of said sectors." The boundaries in such instance, of course, are radial lines which define the inclined sectors, or the arcuate lines which define such sectors. See Figure 3.

The shaft 10 has a plane end which is preferably coated with a hard chromium or nickel plate or anodized in the case of aluminum and is finished to a super-fine degree. Likewise the plane surfaces 12 and inclined surfaces 13 are finely honed typically to a value of about 1–6 microinches R.M.S. An extremely small clearance such as 50 to 400 microinches is provided between the shaft end and the thrust bearing surface. The particular choice of materials for the shaft and thrust bearing is necessary in order to have materials that are able to withstand the severe wear that results under conditions when the bearing is starting or stopping and is not gas borne. This wear is minimized by reason of the series of plane portions 12 from the thrust bearing surface. The number of inclined portions and the number of separating plane sectors may be varied, dependent upon the total surface area of each of the sectors.

Figure 4:
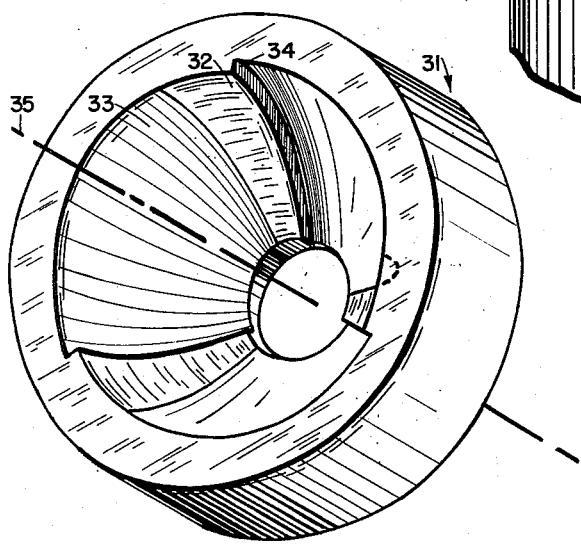
Fig. 4 is a perspective view of a spherical bearing surface.

Fig. 4 illustrates the invention as applied to a spherical bearing. A shaft end (not shown) has an exterior configuration or bearing surface which is parallel to a series of surface sectors or lands 32 spaced on the interior of bearing 31. The surface sectors 32 in Fig. 4 are spherical sectors conforming to the curvature of the shaft end. Inclined sectors 33 separate the lands 32 as in Figs. 1–3. A preferred form of bearing will have three equally spaced lands around the circumference with the inclined portion extending about 96° and the land 24°. The ratio of arcuate length of the inclined portion to the arcuate length of the lands is thus 4:1 in this preferred form, an optimum for operation at relatively low speeds of 1000 r.p.m. Arcuate length, of course, is measured along any selected arc at a fixed distance from the center of the bearing. At higher speeds of the order of 20,000 r.p.m. a preferred ratio is 2:1. The above ratio may extend in a range from about 5:1 to about 1:3. These ratio ranges are also applicable to the plane-type bearings of Figs. 1–3. Likewise, the amount of taper or maximum depth as at 34 of the inclined portions in Fig. 4 correspond to the values set out with respect to Figs. 1–3.

It can be seen that other physical forms of bearings can be constructed using the principle of this invention in which the bearing lands are parallel to the surface being supported. Typically semi-spherical or ovoidal lands may be employed as well as the herein mentioned flat and spherical lands. The inclined surfaces may be generated by machining, etching or selective plating techniques.

The instant gas lubricated thrust bearing has been described in terms of atmospheric air being the gas lubricant. The invention further contemplates the use of various other types of gas for the lubricant. Such gases as hydrogen, nitrogen, acetylene, helium or neon may be used dependent upon the desired load capacity, the viscous friction, and any windage effect.

The herein described bearing is capable of operating under conditions of extreme heat since the viscosity of gas increases with heat, thus assuring better lifting power in the bearing. The bearing is extremely insensitive to gaseous pressure under which it operates, since the viscosity of the gas is largely independent of pressure. The instantly described gas bearing is capable of operation under pressures as low as $\frac{1}{150}$ of a normal atmosphere. The life of the bearing is virtually limitless, since there is no metal-to-metal contact to cause wear.

The instantly disclosed gas bearings are eminently suitable for use in scientific instruments. These bearings require no regular lubricant and allow the interior of the instruments to be perfectly free of oils, greases, and powdered lubricants.

Although the invention has been described and illustrated in detail, it is to be clearly understood that the same is by way of illustration and example only and is not to be taken by way of limitation, the spirit and scope of this invention being limited only by the terms of the appended claims.

I claim:
1. A gas lubricated thrust bearing comprising a first bearing surface, a second bearing surface in juxtaposed spaced relation to said first bearing surface and having a continuous series of alternating inclined sectors and surface sectors, said last-mentioned sectors being parallel to said first bearing surface, the inclined sectors having an inclination from said surface sectors extending to a maximum depth of from 0.00006 to 0.001 inch, shoulder portions normal to said surface sectors extending from maximum depth back to a corresponding surface sector and a gaseous medium surrounding and in the space between said first and second bearing surfaces.

2. A gas lubricated thrust bearing comprising a first bearing surface, a second bearing surface in juxtaposed spaced relation to said first bearing surface and consisting of a continuous series of alternating inclined sectors and surface sectors, said last-mentioned sectors being parallel to said first bearing surface, the inclined sectors having an inclination from said surface sectors extending to a maximum depth of from 0.0002 to 0.0004 inch, the ratio of the arcuate length of the inclined sectors to the arcuate length of the surface sectors being from 5:1 to 1:3, and a gaseous medium having the pressure of the atmosphere surrounding said bearing in the space between said first and second bearing surfaces.

3. A gas lubricated thrust bearing comprising a first bearing surface, a second bearing surface in juxtaposed spaced relation to said first bearing surface and having a continuous series of alternating sectors inclined in depth and connecting surface sectors around the periphery of the second bearing surface, said last-mentioned sectors being parallel to said first bearing surface, the inclined sectors having an inclination from said surface sectors of the order of $\frac{1}{1000}$ of a radian transverse to the boundaries of said sectors, and a gaseous medium surrounding and in the space between said first and second bearing surfaces.

4. An autolubricated gas thrust bearing comprising a flat-ended shaft, a bearing face portion having a series of inclined portions thereon each separated by an adjoining plane portion, the maximum depth of each said inclined portion being connected by a shoulder to a respective adjoining plane portion said face portion being in juxtaposed spaced position with the end of said shaft, with each plane portion being parallel to said shaft end and each said inclined portion diverging from its adjoining plane portion away from said shaft end, a gaseous medium surrounding and in the space between the juxtaposed face portion and the shaft end, relative rotative movement of said face portion with respect to the end of said shaft adapted to create a shearing action on said gaseous medium between the face portion and shaft end, whereby the inclined portions create a net positive pressure causing the shaft end surface and each said plane portion to be separated by the gaseous medium, the angle of inclination of said inclined portions being of the order of $\frac{1}{1000}$ of a radian.

5. The invention as set out in claim 4 in which the ratio of the arcuate length of the inclined portions to the arcuate length of the plane portions on the bearing face portion is approximately 4:1.

6. A gas lubricated thrust bearing comprising a first flat bearing surface, a second bearing surface having a continuous series of alternating inclined surface sectors and adjoining plane surface sectors in juxtaposed spaced relation to said first bearing surface, the inclined sectors being bounded by radials extending on said second bearing surface and having an inclination extending from said plane surface sectors away from said first bearing surface of the order of $\frac{1}{1000}$ of a radian transverse to the radials forming the boundaries of said sectors, and a gaseous medium in the space between said first and second bearing surfaces.

(References on following page)

References Cited in the file of this patent

UNITED STATES PATENTS

| | | |
|---|---|---|
| 1,980,081 | Ovington | Nov. 6, 1934 |
| 2,362,667 | Schmidt | Nov. 14, 1944 |
| 2,603,539 | Brewster | July 15, 1952 |

FOREIGN PATENTS

| | | |
|---|---|---|
| 102,722 | Great Britain | Nov. 1, 1917 |

OTHER REFERENCES

Analysis and Lubrication of Bearings, published by McGraw-Hill, 1st edition, 1949, pages 309–316 relied upon.

"Lubrication Engineering," December 1953, pages 298 thru 301, published by the American Society of Lubrication Engineers, Chicago, Ill. See article "Air Bearings-Low Friction" by D. D. Fuller.

UNITED STATES PATENT OFFICE

CERTIFICATE OF CORRECTION

Patent No. 2,899,243                                                        August 11, 1959

Joseph S. Acterman

It is hereby certified that error appears in the printed specification of the above numbered patent requiring correction and that the said Letter Patent should read as corrected below.

Column 2, line 54, for "0.0002-0.004 inch" read -- 0.0002-0.0004 inch --.

Signed and sealed this 22nd day of March 1960.

(SEAL)
Attest:

KARL H. AXLINE                                                    ROBERT C. WATSON
Attesting Officer                                              Commissioner of Patent